W. BURNET.

Improvement in Paper-Files.

No. 5,088.

Reissued Oct. 8, 1872.

Witnesses:
Wm. J. Peyton.
T. C. Brecht.

Blough, Kendall & Kendall
Assignees of Wm. Burnett.
By James L. Norris
Atty.

AM. PHOTO-LITHOGRAPHIC CO. N.Y. (OSBORNE'S PROCESS.)

UNITED STATES PATENT OFFICE.

WILLIAM BURNET, OF NEW YORK, ASSIGNOR, BY MESNE ASSIGNMENTS, TO WM. R. CLOUGH, NATHL. W. KENDALL, AND HERBERT P. KENDALL, OF BROOKLYN, NEW YORK.

IMPROVEMENT IN PAPER-FILES.

Specification forming part of Letters Patent No. 45,813, dated January 10, 1865; reissue No. 5,088, dated October 8, 1872.

*To all whom it may concern:*

Figure 1:
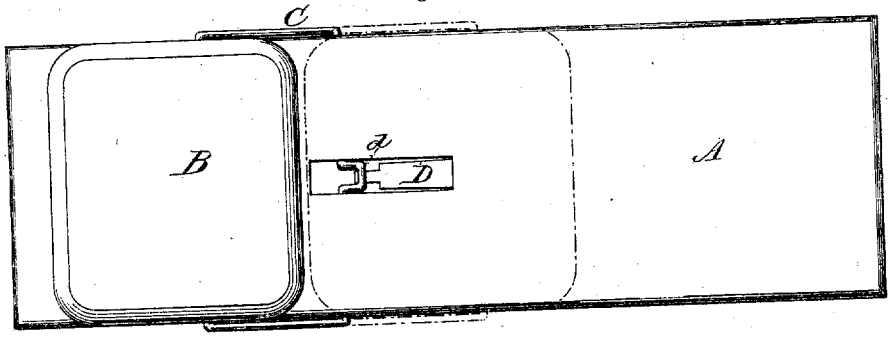
Figure 2:
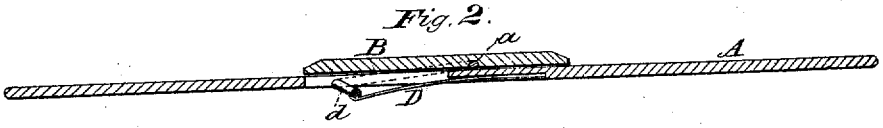
Figure 3:
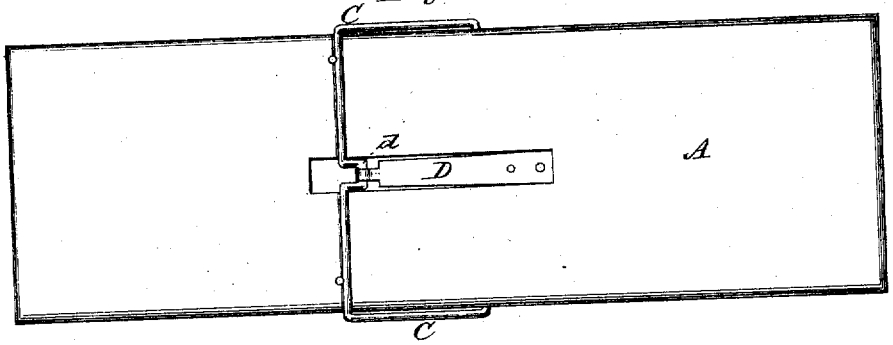

Be it known that WILLIAM BURNET, of the city, county, and State of New York, did invent a new and useful Improvement in Paper-Files, of which the following is a specification:

In the drawing, Figure 1 is a top or plan view of the paper-file; Fig. 2 is a longitudinal section of the same; and Fig. 3 is a top view with one of the leaves removed.

Similar letters of reference indicate corresponding parts in each figure of the drawing.

This invention has for its object to improve upon the paper-files now in use; and it consists in providing the base plate or piece with a clamp or bar which is operated upon by an independent spring in such a manner that when one or more papers or bills are placed upon the said base plate or piece and the clamp brought down upon them the same will be held in the position placed, due to pressure being exerted upon said clamp by said independent spring acting thereon. It further consists in so constructing and arranging a spring and a clamp upon a base plate or piece of a paper-file that when said clamp is raised so as to be at or about right angles with its base that it will retain such position of its own accord, by which means papers, &c., may be placed thereon, removed, or replaced with ease and facility, the operator not having to exert force upon said clamp to retain it in this desired position; and, finally, the invention further consists of two leaves connected by a clamp or bar, said leaves being kept together by means of pressure exerted upon said clamp or bar by an independent spring.

In the drawing, the letter A designates a base plate or piece of a paper-file. C is a clamp or bar arranged upon the base A so that its arm or portion *a* extends over the face or that portion of the base piece or plate upon which the papers or bills are placed for filing, said clamp or bar acting in connection with an independent spring, hereinafter mentioned, so as to retain the papers thus filed in the position placed. The clamp or bar C is provided with a fulcrum, *d*, of crank-form, upon which an independent spring, D, arranged upon the base A, exerts force or pressure so as to cause the arm or portion *a* to move toward the base plate or piece A or the material placed thereon. Clamp or bar C is so arranged upon the base A, and in relation to spring D, that said clamp or bar may oscillate upon its axis so as to vary the direction of its arm or portion *a* in reference to either end of the base-plate. One or more clamp or hinged bars, C, may be employed. B is a leaf or cap connected with the base plate or piece A by clamp or hinged bar C. The spring may be made of a stiff continuous rubber. The leaves also may be made of tin, sheet-iron, or book-binders' boards.

It will be seen from the drawing that the clamp or hinge bar connects the two leaves as by a hinge which turns on two centers, and that the pressure of the spring always throws the clamps or bars and the leaves together; hence, in use it is only necessary to raise the clamp sufficiently to slip in the docketed paper and it is secured, and so on till the file is filled to its capacity. Any paper may be withdrawn by raising the clamp and taking out the paper; pressure of the springs upon the clamp secures the remainder.

Files have been made for holding docketed papers as with two leaves secured by elastic bands with a joint in the upper leaf, which turns back to show the record on the papers, &c.; but I know of none which secures the result so simply as the one hereinbefore specified.

Having thus described my invention, what is claimed as new is—

1. The base plate or piece A of a paper-file provided with a swinging clamp or bar, which is operated upon by an independent spring, for the purpose specified.

2. The combination of the clamp or bar C provided with a crank, *d*, base or plate A, and an independent spring, as described, whereby the clamp, when raised, will stand at an angle of about ninety degrees without force being exerted upon it, as set forth.

3. A paper-file, composed of a base, A, and a cap, B, connected together by a clamp or bar, C, and kept together by means of spring-pressure, for the purpose specified.

To the above we, the assignees, by mesne assignments, of the said WILLIAM BURNET, have hereunto signed our names this 4th day of April, A. D. 1872.

WILLIAM R. CLOUGH.
NATHANIEL W. KENDALL.
HERBERT P. KENDALL.

Witnesses:
JAMES L. NORRIS,
WM. J. PEYTON.